(12) United States Patent
Nakazato (10) Patent No.: US 6,359,727 B1
(45) Date of Patent: Mar. 19, 2002

(54) OPTICAL AMPLIFIER FOR WAVELENGTH-MULTIPLEXING TRANSMISSION

(75) Inventor: Koji Nakazato, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/574,224

(22) Filed: May 19, 2000

(30) Foreign Application Priority Data

May 20, 1999 (JP) ............................................. 11-140122

(51) Int. Cl.[7] ................................................ H01S 3/00
(52) U.S. Cl. ................................. 359/337.4; 359/341.41
(58) Field of Search ............................ 359/337.4, 341.41

(56) References Cited

U.S. PATENT DOCUMENTS 6,055,094 A * 4/2000 Shima et al. ............... 359/341

FOREIGN PATENT DOCUMENTS

JP          8-248455          9/1996

* cited by examiner

*Primary Examiner*—Mark Hellner
(74) *Attorney, Agent, or Firm*—McDermott, Will & Emery (57) ABSTRACT

In an optical amplifier for wavelength-multiplexing transmission of this invention, signals of a plurality of wavelengths in a 1.55-$\mu$m wavelength band, which is input to an input terminal, sequentially passes through an optical isolator and optical coupler, and is input to an amplification optical fiber to be amplified. The signals amplified by and output from the amplification optical fiber sequentially passes through an optical isolator, optical coupler, optical isolator, and optical coupler, and is input to a further amplification optical fiber to be amplified. The signals amplified by and output from the further amplification optical fiber sequentially passes through an optical coupler, optical isolator, and optical coupler and is output from an output terminal. Each of an input-side optical amplifier and output-side optical amplifier performs constant output control.

13 Claims, 9 Drawing Sheets

OPTICAL AMPLIFIER FOR WAVELENGTH-MULTIPLEXING TRANSMISSION

BACKGROUND OF THE INVENTION

1. Field of the Invention

The present invention relates to an optical amplifier for wavelength-multiplexing transmission which amplifies signals of a plurality of wavelengths in a 1.55-μm wavelength band as a single unit in a wavelength multiplexing transmission system.

2. Related Background Art

Conventionally, wavelength-multiplexing transmission is performed using signals of a plurality of wavelengths in a 1.55-μm wavelength band. In such a wavelength-multiplexing transmission system, an optical amplifier for wavelength-multiplexing transmission which amplifies signals of the plurality of wavelengths as a single unit is used. This optical amplifier for wavelength-multiplexing transmission is required to have a high gain, a wide wavelength band capable of optical amplification, flat wavelength dependence of the gain in the wavelength band, a high S/N ratio, a satisfactory noise factor, and a wide dynamic range for input signal level, and has been researched and developed from these viewpoints.

For example, a device disclosed in Japanese Patent Laid-Open No. 5-48207 uses a combination of an optical amplifier whose gain for signals is controlled to a predetermined value, and an optical attenuator provided on the output side of the optical amplifier and having a variable attenuation factor for signals. When the input signal level varies, the output signal level from the optical amplifier also varies. However, a predetermined output signal level from the optical attenuator is maintained by controlling the attenuation factor of the optical attenuator. This widens the dynamic range of input signal level with satisfactory noise factor.

The wavelength dependence of gain with respect to signals in the optical amplifier also depends on the gain. Generally, while controlling the gain of the optical amplifier to obtain a predetermined average gain, a gain equalizer having a fixed gain equalizing characteristic is used to flatten the wavelength dependence of total gain of the optical amplifier and gain equalizer.

For example, a device described in Yoshikazu Saeki et al., "Optical Fiber Amplifier Incorporating Dynamic Equalizing Function", NEC Technical Journal, Vol. 51, No. 4, pp. 45–48 (1998) combines an input-side optical amplifier, gain equalizer, and output-side optical amplifier in the order named. This gain equalizer has an optical circulator and AWG (Arrayed Waveguide Grating). With this arrangement, the signal level of each wavelength is detected, and the gain equalizing characteristic of the gain equalizer is dynamically adjusted on the basis of the detection result, thereby flattening the wavelength dependence of total gain.

However, a conventional optical amplifier for wavelength-multiplexing transmission has the following problems. In the device disclosed in Japanese Patent Laid-Open No. 5-48207, to maintain constant gain control in the optical amplifier even in a region where the input signal level is high, the optical amplifier need to have high output power, as in a region with low input signal level. In addition, to obtain a predetermined output signal level for each wavelength from the output-side optical amplifier, the attenuation factor of the optical attenuator must be as large as the increase amount in input signal level. Hence, to widen the dynamic range of input signal level, pumping light with higher power must be supplied to the optical amplifier, resulting in an increase in power consumption and a decrease in service life of the pumping light source.

In the device described in the above reference, since the insertion loss of the gain equalizer for flattening the wavelength dependence of total gain is as large as 15 dB, the gain of the optical amplifier must be increased to 30 dB. Additionally, in order to supply high-power pumping light to the input-side optical amplifier, the input-side optical amplifier comprises two pumping light sources. Hence, the device described in this reference also increases power consumption and shortens the service life of the pumping light sources.

SUMMARY OF THE INVENTION

The present invention has been made to solve the above problems, and has as its object to provide an optical amplifier for wavelength-multiplexing transmission capable of widening the dynamic range of input signal level without requiring supply of high-power pumping light.

An optical amplifier for wavelength-multiplexing transmission according to the present invention comprises an input-side optical amplifier and an output-side optical amplifier. The input-side optical amplifier has (1) a first amplification optical fiber for amplifying input signals and outputting the amplified signals, (2) first pumping means for supplying first pumping light having power to the first amplification optical fiber, and (3) first pumping light control means for controlling the first pumping means so that an amplification gain of each signal in the first amplification optical fiber decreases in proportion to an increase amount of level of each input signal. The first pumping means supplies, to the first amplification optical fiber, first pumping light having power not more than minimum pumping light power at which the gain of the first amplification optical fiber which has received a minimum input level for the largest number of wavelengths in use causes gain saturation for an increase in input signal level beyond the minimum level. The output-side optical amplifier has (1) a second amplification optical fiber for amplifying the signals input from the input-side optical amplifier and outputting the signals, (2) second pumping means for supplying second pumping light to the second amplification optical fiber, and (3) second pumping light control means for controlling the second pumping means so that the level of each signal output from the second amplification optical fiber has a second gain or target output value.

The optical amplifier for wavelength-multiplexing transmission according to the present invention functions as follows. The input signals are sequentially amplified by the input-side optical amplifier and output-side optical amplifier and output. In optical amplification for signals by the input-side optical amplifier, the first pumping means for supplying the first pumping light to the first amplification optical fiber is controlled by the first pumping light control means such that the amplification gain of each signal in the first amplification optical fiber decreases in proportion to an increase amount of the level of each input signal. The first pumping light control means supplies pumping light having power equal to or smaller than (preferably 90% or less and, more preferably, 80% or less) minimum pumping light power at which the gain of the first amplification optical fiber which has received a minimum input level for the largest number of wavelengths in use causes gain saturation for an increase in input signal level beyond the minimum level. In optical amplification for signals by the output-side optical amplifier, the second pumping means for supplying the second pumping light to the second amplification optical fiber is controlled by the second pumping light control means such that the level of each signal output from the second amplification optical fiber has the second gain or target output value. With such control, without continuously supplying excessively high-power pumping light to maintain the gain of the input-side optical amplifier almost constant across the entire range of input signal level to be used, gain or constant output control can be performed as a whole while minimizing degradation in noise factor and gain flatness.

In the optical amplifier for wavelength-multiplexing transmission according to the present invention, the first pumping light control means controls the first pumping means such that the level of each signal output from the first amplification optical fiber has the first target output value. In this case, the input-side optical amplifier also performs constant output control. Each of the first and second target output values is not limited to one value but has a certain range, so control is performed such that the level of each signal output from each of the input-side optical amplifier and output-side optical amplifier falls within this range. When both the input-side optical amplifier and output-side optical amplifier perform constant output control, the first pumping means is controlled such that the gain of the first amplification optical fiber for the input signal level to the input-side optical amplifier decreases by simple control. With such control, without continuously supplying excessively high-power pumping light to maintain the gain of the input-side optical amplifier almost constant across the entire range of input signal level to be used, gain or constant output control can be performed as a whole while minimizing degradation in noise factor and gain flatness.

The optical amplifier for wavelength-multiplexing transmission according to the present invention further comprises input signal level detection means for detecting the level of each signal input to the input-side optical amplifier, and the first (or second) pumping light control means sets the first (or second) gain or target output value in accordance with the level of each signal detected by the input signal detection means. In this case, in the input-side (or output-side) optical amplifier, the first (or second) gain or target output value in the first (or second) pumping light control means is set on the basis of the input signal level detected by the input signal level detection means, and gain or constant output control is performed such that the output signal level has the set first (or second) gain or target output value. Thus, the wavelength dependence of total gain can be maintained smaller even when the input signal level varies.

The optical amplifier for wavelength-multiplexing transmission according to the present invention further comprises input signal level detection means for detecting the level of each signal input to the input-side optical amplifier, and the first (or second) pumping light control means sets the gain of optical amplification in the first (or second) amplification optical fiber in accordance with the level of each signal detected by the input signal level detection means and controls the first (or second) pumping means on the basis of the gain. In this case, in the input-side (or output-side) optical amplifier, the gain of optical amplification in the first (or second) amplification optical fiber is set on the basis of the input signal level detected by the input signal level detection means, and the first (or second) pumping means is controlled on the basis of the gain. Thus, the input-side (or output-side) optical amplifier performs gain or constant output control such that the output signal level has the first (or second) gain or target output value, so the wavelength dependence of total gain can be maintained small when the input signal level varies.

In this case, preferably, the input-side (output-side) optical amplifier includes a first optical amplification section and second optical amplification section, and the first (or second) pumping light control means sets the gain of optical amplification for each of the first and second optical amplification sections in accordance with the level of each signal detected by the input signal level detection means. In this case, even when complete gain or constant output control cannot be performed by the stand-alone first or second optical amplification section, it can be performed by the input-side (or output-side) optical amplifier as a whole including the firsthand second optical amplification sections.

The optical amplifier for wavelength-multiplexing transmission according to the present invention further comprises input signal level detection means for detecting the level of each signal input to the input-side optical amplifier, an optical attenuator inserted between the input-side optical amplifier and the output-side optical amplifier and having a variable attenuation factor for the signals, and attenuation factor control means for controlling the attenuation factor of the optical attenuator in accordance with the level of each signal detected by the input signal level detection means. In this case, the signals are amplified by the input-side optical amplifier under constant output control, attenuated by the optical attenuator by the attenuation factor corresponding to the input signal level detected by the input signal level detection means, and further amplified by the output-side optical amplifier under constant output control. With this arrangement, the wavelength dependence of total gain can be maintained small even when the input signal level varies.

The optical amplifier for wavelength-multiplexing transmission according to the present invention further comprises a gain equalizer inserted between the input-side optical amplifier and the output-side optical amplifier to equalize a wavelength dependence of gain for signals as a whole. In this case, the signal are amplified by the input-side optical amplifier under constant output control, gain-equalized by the gain equalizer, and further amplified by the output-side optical amplifier under constant output control. With this arrangement, the wavelength dependence of total gain can be further reduced.

In optical amplifier for wavelength-multiplexing transmission according to the present invention, the first amplification optical fiber comprises an Er-doped optical fiber co-doped with Al, and the second amplification optical fiber comprises an Er-doped optical fiber co-doped with Al and P and an Er-doped optical fiber co-doped with Al, which are connected in the order named. In this case, even when the gain of the input-side optical amplifier is small, and the level of each signal input to the output-side optical amplifier is low, the wavelength dependence of total gain can be maintained small. For the second amplification optical fiber, the Er-doped optical fiber co-doped with Al and P and Er-doped optical fiber co-doped with Al may be directly connected, or another amplification optical fiber may be inserted therebetween. The Er-doped optical fiber co-doped with Al is substantially undoped with P.

In the optical amplifier for wavelength-multiplexing transmission according to the present invention, the first pumping means supplies the first pumping light at least from a front side to the first amplification optical fiber. In this case, the inverted distribution state near the signal incident side of the first amplification optical fiber can be made high even when the gain of the input-side optical amplifier is small, and the first amplification optical fiber has a low inverted distribution state as a whole. For this reason, degradation in noise factor can be reduced.

DESCRIPTION OF THE PREFERRED EMBODIMENTS

The embodiments of the present invention will be described below in detail with reference to the accompanying drawings. The same reference numerals denote the same parts throughout the drawings, and a detailed description thereof will be omitted.

(First Embodiment)

Figure 1:
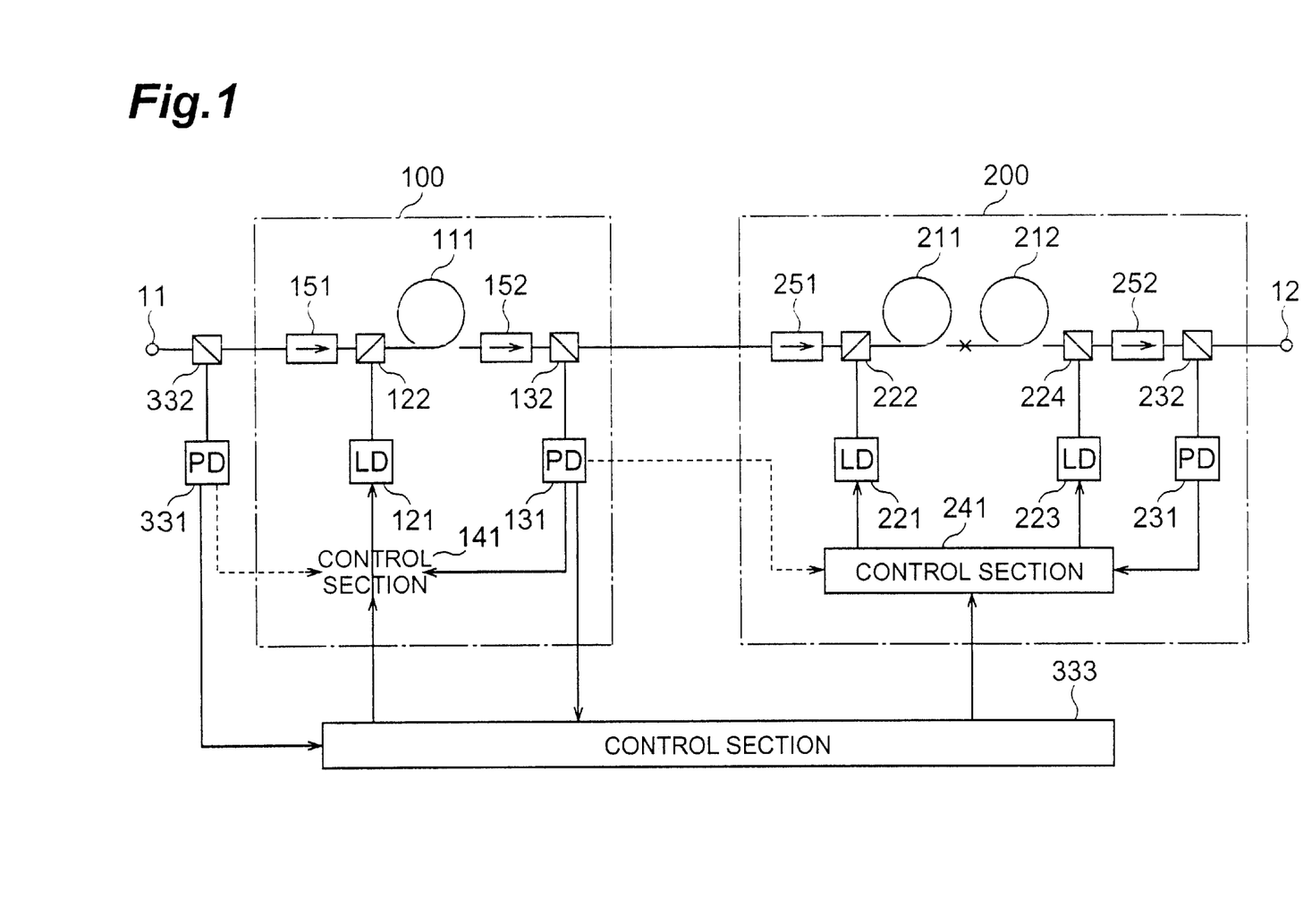
FIG. 1 is a view showing the arrangement of an optical amplifier for wavelength-multiplexing transmission according to the first embodiment.

An optical amplifier for wavelength-multiplexing transmission according to the first embodiment of the present invention will be described first. FIG. 1 is a view showing the arrangement of the optical amplifier for wavelength-multiplexing transmission according to the first embodiment. In the optical amplifier for wavelength-multiplexing transmission of this embodiment, an input-side optical amplifier 100 and output-side optical amplifier 200 are connected between an input terminal 11 and an output terminal 12 in this order. A light-receiving element 331 and optical coupler 332 are connected to the signal input side of the input-side optical amplifier 100 to construct an input signal level detection means for detecting the level of each signal input to the input-side optical amplifier 100. The optical amplifier for wavelength-multiplexing transmission also has a control section 333 for controlling the entire optical amplifier.

In the input-side optical amplifier 100, an optical isolator 151, optical coupler 122, amplification optical fiber (first amplification optical fiber) 111, optical isolator 152, and optical coupler 132 are sequentially connected from the signal input side to the signal output side. The optical isolators 151 and 152 pass light in the forward direction but shield light in the reverse direction. The amplification optical fiber 111 is a silica-based optical fiber having a core region doped with a rare earth element. In particular, an optical fiber having a core region doped with Er as a rare earth element is preferably used. More preferably, the optical fiber whose core region is further co-doped with Al is used.

A pumping light source 121 is connected to the optical coupler 122. The pumping light source 121 outputs pumping light (wavelength: 0.98 $\mu$m or 1.48 $\mu$m) to be supplied to the amplification optical fiber 111 and preferably comprises, e.g., a semiconductor laser source. The optical coupler 122 receives pumping light output from the pumping light source 121 and outputs the pumping light to the amplification optical fiber 111, and also receives signals output from the optical isolator 151 and outputs the signals to the amplification optical fiber 111. That is, the pumping light source 121 and optical coupler 122 construct a first pumping means for supplying pumping light to the amplification optical fiber 111.

A light-receiving element 131 is connected to the optical coupler 132. The optical coupler 132 demultiplexes part from the signals output from the amplification optical fiber 111 and outputs the part to the light-receiving element 131. The light-receiving element 131 receives the signals that have arrived from the optical coupler 132 and outputs electrical signals corresponding to the powers of the signals. For example, a photodiode is preferably used as the light-receiving element. That is, the light-receiving element 131 and optical coupler 132 construct a first output signal level detection means for detecting the level of each signal output from the amplification optical fiber 111.

The input-side optical amplifier 100 has a control section (first pumping light control means) 141. The control section 141 controls the pumping light source 121 such that the signal amplification gain of the amplification optical fiber 111 decreases in proportion to the increase amount of input signal level. Especially, the control section 141 preferably receives electrical signals output from the light-receiving elements 331 and 131, detects the level of each signal output from the amplification optical fiber 111 on the basis of the electrical signals, and controls the power of pumping light supplied from the pumping light source 121 to the amplification optical fiber 111 such that the detected output signal level becomes equal to a predetermined gain or target output value (first target gain or output value) which should be decreased by the control section 141 or 333 in proportion to the increase amount of input signal level. The gain or target output value is not limited to one value but has a certain range, so control is performed such that the gain or output level of each signal output from the input-side optical amplifier 100 falls within this range. The power of pumping light supplied to the amplification optical fiber 111 only need give a necessary S/N ratio and is preferably 90% or less (more preferably, 80% or less) of pumping light power that saturates the gain.

In the output-side optical amplifier 200, an optical isolator 251, optical coupler 222, amplification optical fibers (second amplification optical fibers) 211 and 212, optical coupler 224, optical isolator 252, and optical coupler 232 are sequentially connected from the signal input side to the signal output side. The optical isolators 251 and 252 pass light in the forward direction but shield light in the reverse direction. The amplification optical fibers 211 and 212 are silica-based optical fibers each having a core region doped with a rare earth element. Especially, optical fibers each having a core region doped with Er as a rare earth element are preferably used. More preferably, an optical fiber having a core region co-doped with Al and P is used as the amplification optical fiber 211, and an optical fiber having a core region do-doped with Al is used as the amplification optical fiber 212.

A pumping light source 221 is connected to the optical coupler 222. The pumping light source 221 outputs pumping light (wavelength: 1.48 μm) to be supplied to the amplification optical fibers 211 and 212 and preferably comprises, e.g., a semiconductor laser source. The optical coupler 222 receives pumping light output from the pumping light source 221 and outputs the pumping light to the amplification optical fiber 211, and also receives signals output from the optical isolator 251 and outputs the signals to the amplification optical fiber 211. A pumping light source 223 is connected to the optical coupler 224. The pumping light source 223 outputs pumping light (wavelength: 1.48 μm) to be supplied to the amplification optical fibers 211 and 212 and preferably comprises, e.g., a semiconductor laser source. The optical coupler 224 receives pumping light output from the pumping light source 223 and outputs the pumping light to the amplification optical fiber 212, and also receives signals output from the amplification optical fiber 212 and outputs the signals to the optical isolator 252. That is, the pumping light source 221 and optical coupler 222, and the pumping light source 223 and optical coupler 224 constitute a second pumping means for supplying pumping light to the amplification optical fibers 211 and 212.

A light-receiving element 231 is connected to the optical coupler 232. The optical coupler 232 demultiplexes part from the signals output from the amplification optical fiber 212 and outputs the part to the light-receiving element 231. The light-receiving element 231 receives the signals that have arrived from the optical coupler 232 and outputs electrical signals corresponding to the powers of the signals. For example, a photodiode is preferably used as the light-receiving element. That is, the light-receiving element 231 and optical coupler 232 construct a second output signal level detection means for detecting the level of signal output from the amplification optical fiber 212.

The output-side optical amplifier 200 has a control section (second pumping light control means) 241. The control section 241 receives electrical signals output from the light-receiving elements 131 and 231, detects the level of each signal output from the amplification optical fibers 111 and 212 on the basis of the electrical signals, and controls the power of pumping light supplied from the pumping light sources 221 and 223 to the amplification optical fibers 211 and 212 such that each of the detected output signal level becomes equal to predetermined gain or target output value (second gain or target output value) which is defined by the control section 333. The target output value is not limited to one value but has a certain range, so control is performed such that the level of each signal output from the output-side optical amplifier 200 falls within this range.

The optical amplifier for wavelength-multiplexing transmission of this embodiment operates in the following way. In the input-side optical amplifier 100, pumping light output from the pumping light source 121 is supplied to the amplification optical fiber 111 through the optical coupler 122. In the output-side optical amplifier 200, pumping light output from the pumping light source 221 is supplied to the amplification optical fibers 211 and 212 through the optical coupler 222 while pumping light output from the pumping light source 223 is supplied to the amplification optical fibers 212 and 211 through the optical coupler 224.

When signals of a plurality of wavelengths in the 1.55-μm wavelength band is input to the input terminal 11, part is demultiplexed from the signals by the optical coupler 332 and received by the light-receiving element 331. Electrical signals corresponding to the power of received signals are output from the light-receiving element 331 to the control sections 141 and 333. The signals also sequentially pass through the optical isolator 151 and optical coupler 122, and is input to the amplification optical fiber 111 to be amplified. The signals amplified and output from the amplification optical fiber 111 sequentially pass through the optical isolator 152, optical coupler 132, optical isolator 251, and optical coupler 222, and is input to the amplification optical fibers 211 and 212 to be amplified. The signals amplified and output from the amplification optical fibers 211 and 212 sequentially pass through the optical coupler 224, optical isolator 252, and optical coupler 232 and is output from the output terminal 12.

In optical amplification by the input-side optical amplifier 100, part of the signals output from the amplification optical fiber 111 is demultiplexed by the optical coupler 132 and received by the light-receiving element 131. Electrical signals corresponding to the power of received signals are output from the light-receiving element 131 to the control section 141. On the basis of the electrical signals, the control section 141 controls the power of pumping light supplied from the pumping light source 121 to the amplification optical fiber 111 such that the level of each signal output from the amplification optical fiber 111 becomes equal to a predetermined gain or target output value, which should be decreased by the control section 141 or 333 in proportion to the increase amount of input signal level. The input-side optical amplifier 100 may perform constant output control on the basis of only the electrical signals from the light-receiving element 131 when the decrease amount of gain of the input-side optical amplifier 100 is set to be equal to the increase amount of input signal level.

In optical amplification by the output-side optical amplifier 200, part of the signals output from the amplification optical fiber 212 is demultiplexed by the optical coupler 232 and received by the light-receiving element 231. Electrical signals corresponding to the power of received signals are output from the light-receiving element 231 to the control section 241. In addition, an output electrical signal from the input-side optical amplifier 100, which determines the input signal level to the output-side optical amplifier 200, is output from the light-receiving element 131 to the control section 241. On the basis of the electrical signals, the control section 241 controls the power of pumping light supplied from the pumping light source 221 to the amplification optical fibers 211 and 212 and the power of pumping light supplied from the pumping light source 223 to the amplification optical fibers 212 and 211 such that the level of each signal output from the amplification optical fiber 212 becomes equal to a predetermined gain or target output value defined by the control section 333. The output-side optical amplifier 200 may also perform constant output control on the basis of only the electrical signals from the light-receiving element 231.

Figure 2:
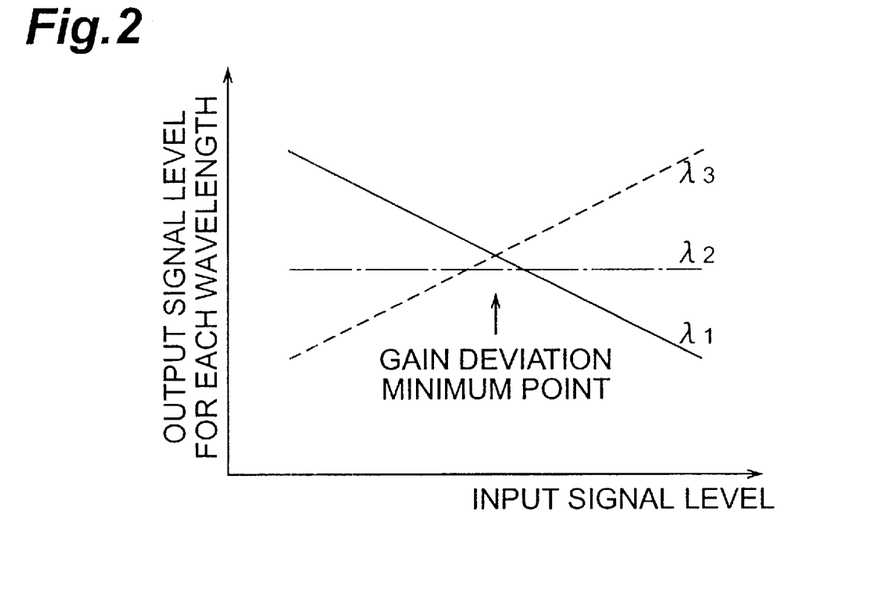
FIG. 2 is a graph showing the relationship between the input signal level and output signal level in the optical amplifier for wavelength-multiplexing transmission in units of wavelengths.

The optical amplifier for wavelength-multiplexing transmission according to this embodiment has the following wavelength dependence of gain. FIG. 2 is a graph showing the relationship between the input signal level and output signal level in the optical amplifier for wavelength-multiplexing transmission every wavelength. Generally, output signal level $P_{out}$ (level detected by the light-receiving element 231) depends on input signal level $P_{in}$ (level detected by the light-receiving element 331), and the dependence changes in accordance with the wavelength $\lambda$. More specifically, the output signal level $P_{out}$ is a function of the input signal level $P_{in}$ and wavelength $\lambda$. Let DGT($\lambda$) be the rate of change of output signal level $P_{out}$ with respect to a change of 1 dB in input signal level $P_{in}$ of the signal with the wavelength $\lambda$. Then, the rate of change DGT($\lambda$) is given by $$DGT(\lambda) = \frac{dP_{out}(P_{in}, \lambda)}{dP_{in}} \qquad (1)$$

Figure 3:
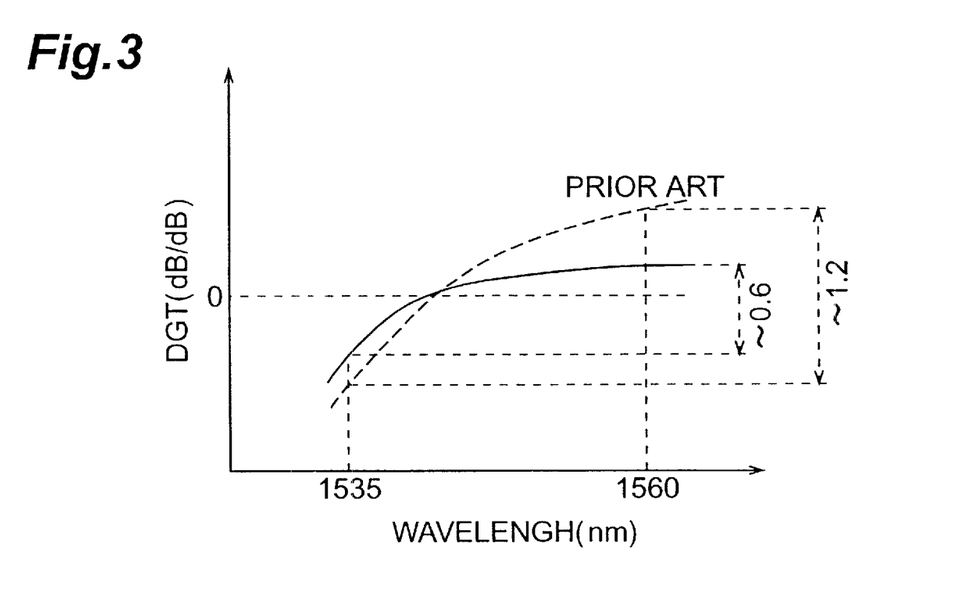
FIG. 3 is a graph showing the relationship between the signal wavelength and the DGT value in the optical amplifier for wavelength-multiplexing transmission according to the first embodiment.

FIG. 3 is a graph showing the relationship between the signal wavelength and the DGT value in the optical amplifier for wavelength-multiplexing transmission according to the first embodiment. The solid line in FIG. 3 indicates a case wherein the gain decrease amount of the input-side optical amplifier 100 is set to be equal to the increase amount of input signal level to the input-side optical amplifier 100, and constant output control is performed for both the input-side optical amplifier 100 and output-side optical amplifier 200. The broken line represents the conventional case wherein constant gain control is performed not to change the gain of the input-side optical amplifier in accordance with input signal level, and the output-side optical amplifier performs constant output control by a variable optical attenuator set at the input on the output side. In this case, since the input level becomes high, and the electrical signal power is limited, the input-side optical amplifier performs pumping light power constant control. As shown in FIG. 3, the difference in DGT value between a wavelength of 1,535 nm and a wavelength of 1,560 nm is about 1.2 dB/dB in the conventional case (broken line) but is as small as about 0.6 dB/dB in this embodiment (solid line).

In this embodiment, when constant output control is performed for both the input-side optical amplifier 100 and output-side optical amplifier 200, the dependence of value DGT($\lambda$) on the wavelength $\lambda$ can be reduced as compared to the case wherein pumping light power constant control is performed for the input-side optical amplifier 100. Hence, even when the input signal level varies, the wavelength dependence of total gain is small, and the dynamic range of input signal level can be made wide. Additionally, in this embodiment, since no optical component that gives a large loss to the signals is inserted, the gain of the input-side optical amplifier 100 need not be made as large as in the prior art, and no high-power pumping light need be supplied.

In this embodiment, the amplification optical fiber 211 in the output-side optical amplifier 200 is formed from an Er-doped optical fiber having a core region co-doped with Al and P. The amplification optical fiber 212 following the amplification optical fiber 211 is formed from an Er-doped optical fiber having a core region co-doped with Al. Hence, even when the gain of the input-side optical amplifier 100 is small, and the level of signal input to the output-side optical amplifier 200 is low, the wavelength dependence of total gain can be kept small.

In this embodiment, pumping light output from the pumping light source 121 in the input-side optical amplifier 100 is supplied to the amplification optical fiber 111 from the front side. Hence, even when the gain of the input-side optical amplifier 100 is small, and the amplification optical fiber 111 has a low inverted distribution state as a whole, the inverted distribution state near the signal incident side of the amplification optical fiber 111 can be made high, and degradation in noise factor can be reduced.

Figure 4A:
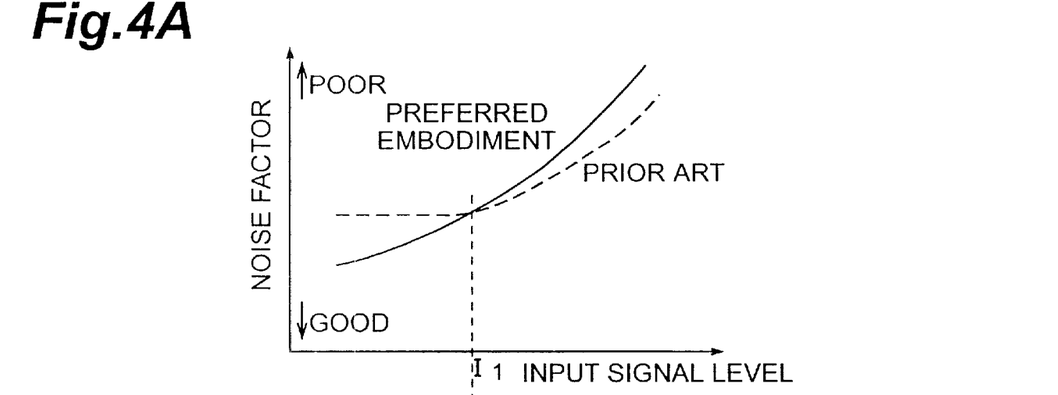
FIGS. 4A to 4C are graphs showing the noise factor, S/N ratio, and gain deviation in the optical amplifier for wavelength-multiplexing transmission, respectively.
Figure 4B:
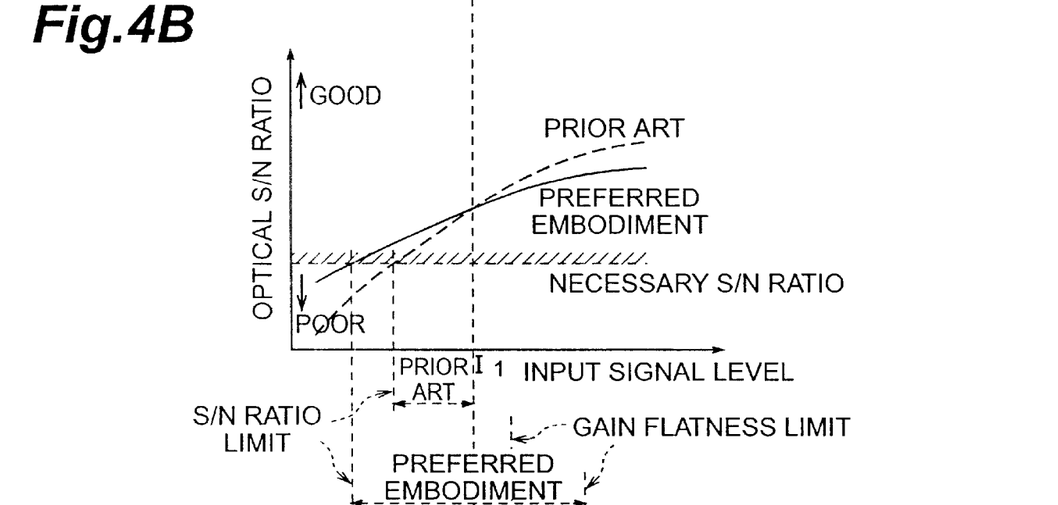
Figure 4C:
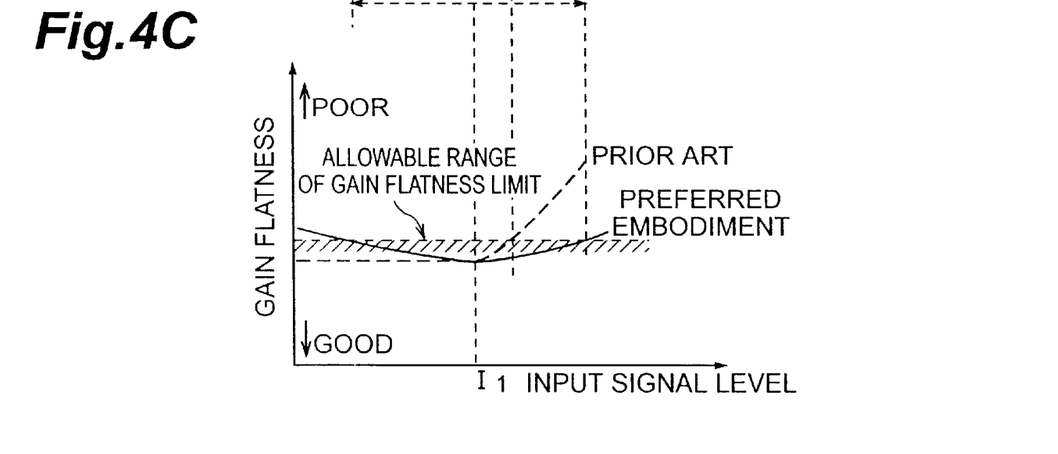

FIGS. 4A to 4C are graphs showing the noise factor, S/N ratio, and gain deviation in the optical amplifier for wavelength-multiplexing transmission, respectively. Referring to FIGS. 4A to 4C, each solid line indicates this embodiment, and each broken line indicates the prior art. As shown in FIGS. 4A to 4C, in the prior art (broken line), under maximum input level $I_1$ at which the input signal level can maintain a predetermined gain, gain flatness does not degrade because the input-side optical amplifier can maintain constant gain control (FIG. 4C). However, since the gain of the input-side optical amplifier is limited to the gain when the maximum input level $I_1$ is input, the noise factor cannot be sufficiently decreased (FIG. 4A). Additionally, in the prior art (broken line), when the input signal level exceeds the maximum input level $I_1$, the input-side optical amplifier cannot maintain constant gain control, the pumping light power becomes constant, and the gain flatness degrades as the input signal level becomes high (FIG. 4C).

To the contrary, in this embodiment (solid line), control is performed such that when the number of wavelengths used is largest, a largest gain is obtained at the lowest input signal level. For this reason, in a region where the input signal level is low, the noise factor can be made smaller than in the prior art. In the region where the input signal level is high, the noise factor slightly degrades but remains within an allowable range (FIG. 4A). Unlike the prior art (broken line), this embodiment (solid line) is excellent in gain flatness (FIG. 4C). However, when the input signal level exceeds $I_1$, the S/N ratio of a single optical amplifier is lower in this embodiment than in the prior art (FIG. 4B). However, when a number of conventional optical amplifiers are connected for relay amplification, the gain flatness largely degrades at a level higher than the input signal level $I_1$, and therefore, the S/N ratio degrades with a signal having a wavelength at which the gain is smaller than the section loss. In this embodiment, however, since the gain flatness is excellent, the degradation in S/N ratio can be suppressed even when a number of optical amplifiers are connected. Hence, in this embodiment (solid line), a necessary S/N ratio can be ensured by maintaining satisfactory gain flatness across a wide dynamic range of input signal level, unlike the prior art (broken line).

Figure 5A:
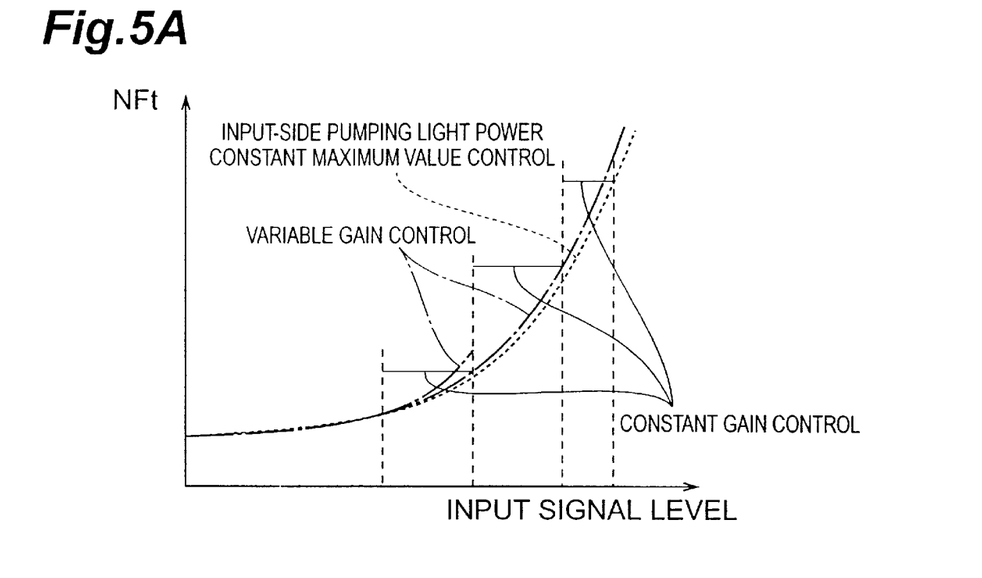
FIGS. 5A and 5B are graphs showing the relationships between the input signal level and a total noise factor NFt in the optical amplifier for wavelength-multiplexing transmission.
Figure 5B:
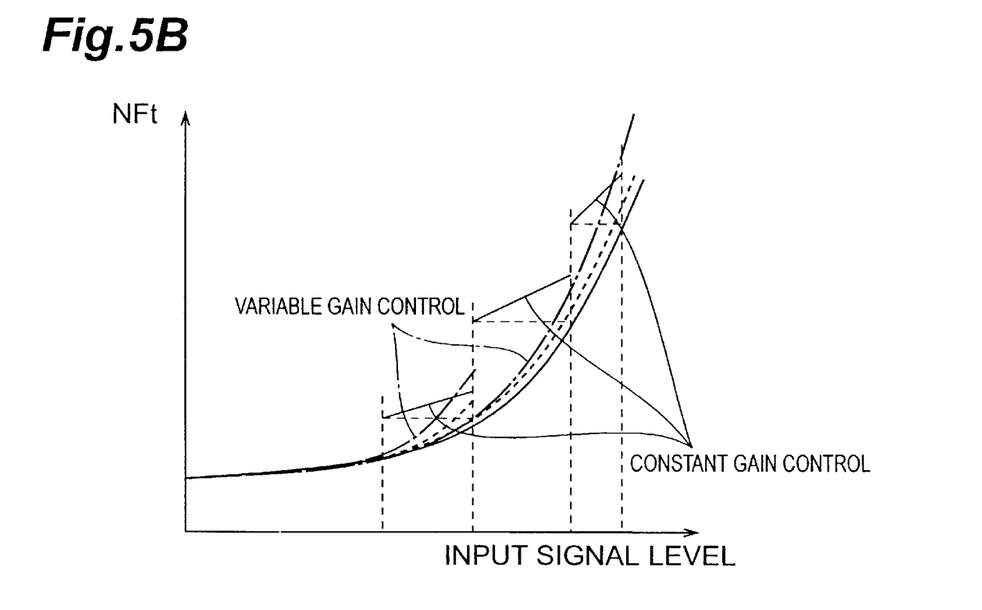

This can be explained using equations and FIG. 5. Let $G_1$ (dB) be the amplification gain and $NF_1$ (dB) be the noise factor of the input-side optical amplifier 100. Let $G_2$ (dB) be the amplification gain and $NF_2$ (dB) be the noise factor of the output-side optical amplifier 200. Assume that an optical attenuator with an attenuation factor $\alpha_m$ (dB) is inserted between the input-side optical amplifier 100 and the output-side optical amplifier 200. Let $P_{in}$ (dBm) be the input signal level.

Then, a total gain $G_t$ (dB) of the wavelength multiplexed transmission optical amplifier according to this embodiment is given by $$G_t = G_1 - \alpha_m + G_2 \qquad (2)$$

For a variation $\Delta P_{in}$ in input signal level, the amplification gain $G_1$ of the input-side optical amplifier 100 and the amplification gain $G_2$ of the output-side optical amplifier 200 are respectively controlled to change at rates given by $$\Delta G_1 = A \cdot (-\Delta P_{in}) \qquad (3a)$$

$$\Delta(G_2-\alpha_m)=(A-1)\cdot\Delta P_{in} \quad (3b)$$

for $$A>0 \quad (3c)$$

When the amplification gains of the input-side optical amplifier 100 and output-side optical amplifier 200 are controlled in this way, the total gain $G_t$ of the optical amplifier for wavelength-multiplexing transmission is controlled to change at a rate given by $$\Delta G_t = -\Delta P_{in} \quad (4)$$

More specifically, constant output control can be performed as a whole by controlling the amplification gain $G_2$ of the output-side optical amplifier 200 in accordance with an increase/decrease in amplification gain $G_1$ of the input-side optical amplifier 100. Equation (3b) is necessary for obtaining constant signal output level from the entire optical amplifier including both the input-side optical amplifier 100 and output-side optical amplifier 200 and is not always necessary when the signal output level of the entire optical amplifier need not be maintained constant.

The S/N ratio (dB) and noise factor $NF_t$ (dB) of the entire optical amplifier for wavelength-multiplexing transmission according to this embodiment are given by $$S/N \text{ ratio} = \frac{1}{h\cdot v\cdot \Delta v} \times \frac{P_{in}}{f_t} \quad (5a)$$

for $$P_{in}=10\cdot\log_{10}(p_{in}) \quad (5b)$$

$$NF_t = 10\cdot\log_{10}(f_t) \quad (5c)$$
$$= 10\cdot \log_{10}(f_1 + f_2/(a_m\cdot g_1))$$

$$NF_1=10\cdot\log_{10}(f_1) \quad (5d)$$

$$NF_2=10\cdot\log_{10}(f_2) \quad (5e)$$

$$G_1 32\ 10\cdot\log_{10}((g_1) \quad (5f)$$

$$\alpha_m=-10\cdot\log_{10}(\alpha_m) \quad (5g)$$

where h is the Planck constant, and $v$ is the signal frequency. As is apparent from these equations, when the rate of change $\Delta f_t$ is small relative to the rate of change $\Delta p_{in}$ of $p_{in}$, the total S/N ratio continuously increases even when the input signal level $P_{in}$ becomes high to degrade the noise factor $NF_t$. The total noise factor $NF_t$ has basically nothing to do with the amplification gain $G_2$ of the output-side optical amplifier 200. The total noise factor $NF_t$ increases when the amplification gain $G_1$ of the input-side optical amplifier 100 decreases, or the attenuation factor $\alpha_m$ of the optical attenuator in the middle.

FIGS. 5A and 5B are graphs showing the relationships between the input signal level $P_{in}$ and the total noise factor $NF_t$ in the optical amplifier for wavelength-multiplexing transmission. FIG. 5A is a graph obtained when the attenuation factor $\alpha_m$ of the optical attenuator in the middle is fixed. FIG. 5B is a graph obtained when the attenuation factor $\alpha_m$ of the optical attenuator in the middle is increased for constant output control or to flatten the gain vs. waveform characteristic. Each of FIGS. 5A and 5B shows the relationship between the input signal level $P_{in}$ and the total noise factor $NF_t$ for each of variable gain control of this embodiment, constant gain control of the prior art, and input-side pumping light power maximum value constant control of the prior art.

As is apparent from FIGS. 4A to 4C, FIGS. 5A and 5B, and equations (2) to (5), when variable gain control is performed such that the amplification gain $G_1$ of the input-side optical amplifier 100 decreases in proportion to the increase amount of the input signal level $P_{in}$ (equation 3a), the degradation in noise factor $NF_t$ can be suppressed (equation 5c, and FIGS. 4A and 5A) while ensuring the necessary S/N ratio across a wide dynamic range of input signal level (equation 5a and FIG. 4B). In addition, when the attenuation factor $\alpha_m$ of the optical attenuator in the middle is increased in accordance with an increase in input signal level $P_{in}$ for constant output control or to flatten the gain vs. waveform characteristic, generally, the total noise factor $NF_t$ increases (equation 5c). However, when variable gain control is performed such that the amplification gain $G_1$ of the input-side optical amplifier 100 increases in proportion to the decrease amount of the input signal level $P_{in}$ (equation 3a), the noise factor $NF_t$ can be made small as the input signal level $P_{in}$ becomes low (equation 5c and FIG. 5B).

(Second Embodiment)

Figure 6:
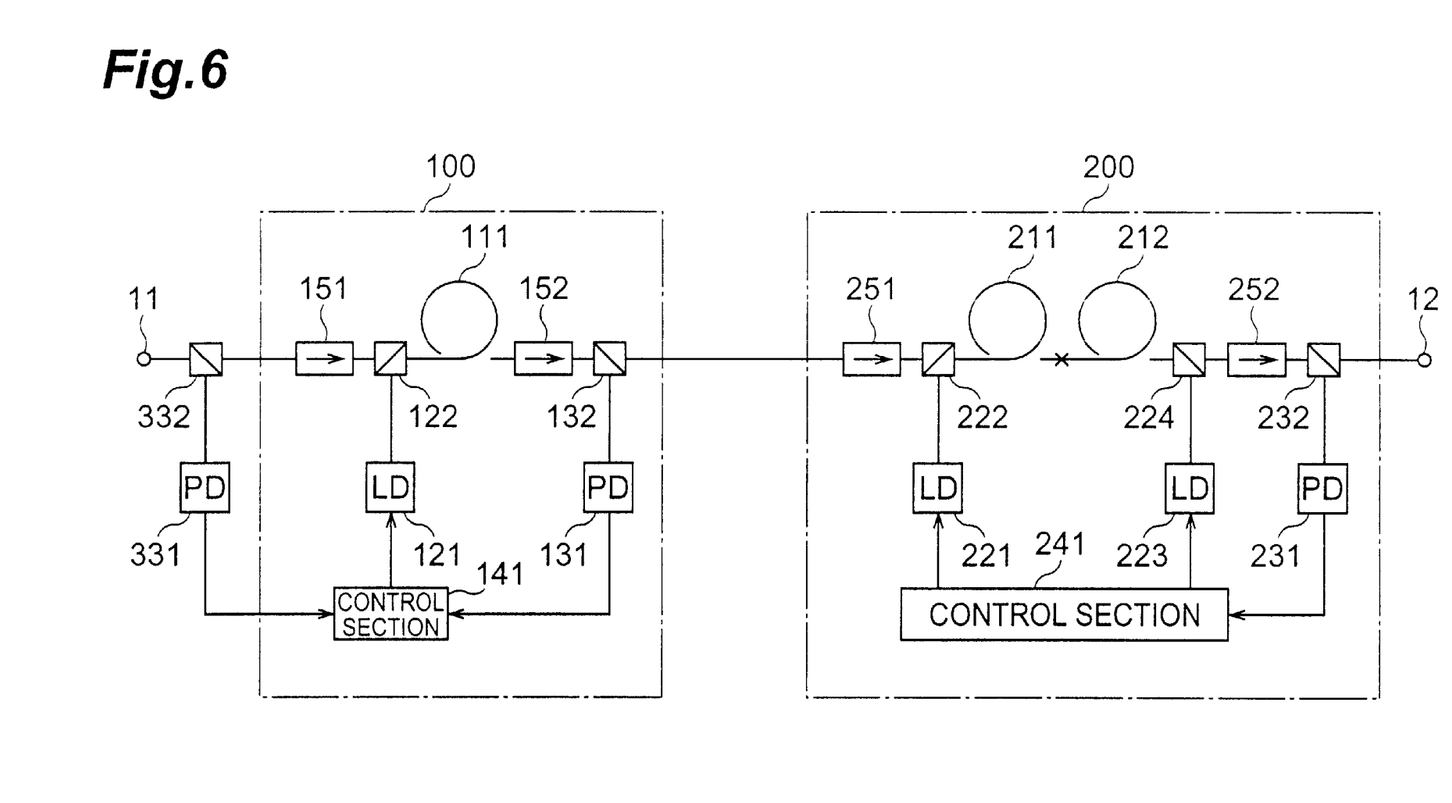
FIG. 6 is a view showing the arrangement of an optical amplifier for wavelength-multiplexing transmission according to each of the second and third embodiments.

An optical amplifier for wavelength-multiplexing transmission according to the second embodiment of the present invention will be described next. FIG. 6 is a view showing the arrangement of the optical amplifier for wavelength-multiplexing transmission according to the second embodiment. The wavelength multiplexed transmission optical amplifier of the second embodiment is different from that of the first embodiment in that the target output value is set by a control section 141 of an input-side optical amplifier 100 in accordance with input signal level.

Figure 7:
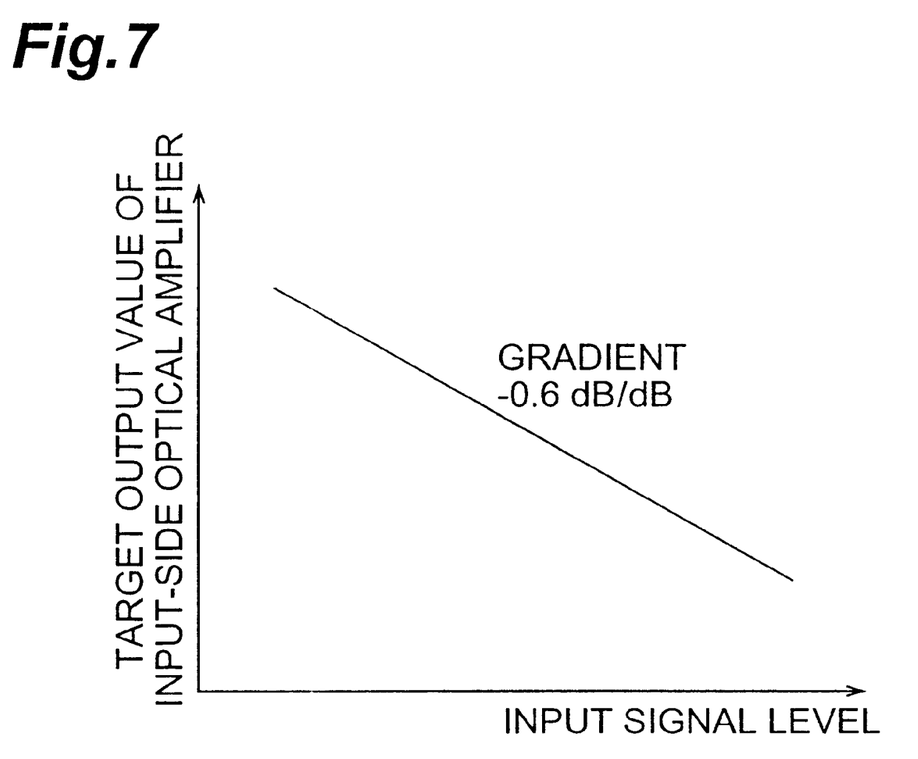
FIG. 7 is a graph showing the relationship between the input signal level and the target output value of the input-side optical amplifier in the optical amplifier for wavelength-multiplexing transmission according to the second embodiment.

FIG. 7 is a graph showing the relationship between the input signal level and the target output value of the input-side optical amplifier 100 in the optical amplifier for wavelength-multiplexing transmission according to the second embodiment. As shown in FIG. 7, as the input signal level detected by a light-receiving element 331 becomes lower, the target output value is set to be smaller by the control section 141 of the input-side optical amplifier 100. The gradient of the target output value relative to the input signal level is, e.g., about −0.6 dB/dB. In optical amplification by the input-side optical amplifier 100, the control section 141 controls the power of pumping light to be supplied from a pumping light source 121 to an amplification optical fiber 111 such that the level of each signal output from the amplification optical fiber 111 has the set target output value.

That is, in the input-side optical amplifier 100, the target output value is set on the basis of the input signal level, and constant output control is performed that that the output signal level has this target output value. Hence, the higher the input signal level is, the lower the level of each signal output from the input-side optical amplifier 100 and input to an output-side optical amplifier 200 becomes. The signals are amplified by the output-side optical amplifier 200 under constant output control. Thus, the optical amplifier for wavelength-multiplexing transmission according to the second embodiment has almost the same effect as that of the first embodiment and can also maintain the wavelength dependence of total gain small even when the input signal level varies.

In this embodiment, constant output control is performed in the input-side optical amplifier 100 such that the output signal level has the target output value set on the basis of the input signal level. However, in a similar manner, constant output control may be performed in the output-side optical amplifier 200 such that the output signal level has the target output value set on the basis of the input signal level. Alternatively, constant output control may be performed in each of the input-side optical amplifier 100 and output-side optical amplifier 200 such that the output signal level has a corresponding target output value set on the basis of the input signal level.

(Third Embodiment)

An optical amplifier for wavelength-multiplexing transmission according to the third embodiment of the present invention will be described next. The optical amplifier for wavelength-multiplexing transmission according to the third embodiment has almost the same arrangement as that of the second embodiment shown in FIG. 6. However, the optical amplifier for wavelength-multiplexing transmission according to the third embodiment is different from that of the second embodiment in that a control section 141 of an input-side optical amplifier 100 sets the gain of optical amplification by an amplification optical fiber 111 in accordance with input signal level and controls a pumping light source 121 on the basis of this gain.

More specifically, as the input signal level detected by a light-receiving element 331 becomes high, the gain of optical amplification by the amplification optical fiber 111 in the input-side optical amplifier 100 is set to be small, and the power of pumping light supplied from the pumping light source 121 to the amplification optical fiber 111 is controlled to be small by the control section 141. Thus, in the input-side optical amplifier 100, constant output control is performed such that the output signal level has the target output value. Hence, the higher the input signal level is, the lower the level of each signal output from the input-side optical amplifier 100 and input to an output-side optical amplifier 200 becomes. The signals are amplified by the output-side optical amplifier 200 under constant output control. Thus, the optical amplifier for wavelength-multiplexing transmission according to the third embodiment has almost the same effect as that of the first embodiment and can also maintain the wavelength dependence of total gain small even when the input signal level varies.

The input-side optical amplifier 100 of this embodiment preferably has a multi-stage structure including the first and second optical amplification sections. In this case, in each of the first and second optical amplification sections, the gain of optical amplification by an amplification optical fiber is set in accordance with the input signal level, and the pumping light source is controlled on the basis of this gain. With this arrangement, complete constant output control cannot be performed by the stand-alone first or second optical amplification section but can be performed by the input-side optical amplifier 100 as a whole including the first and second optical amplification sections.

In this embodiment, the gain is set in the input-side optical amplifier 100 on the basis of the input signal level, and the pumping light source 121 is controlled on the basis of this gain. In a similar manner, the gain may be set in the output-side optical amplifier 200 on the basis of the input signal level, and a pumping light source 221 may be controlled on the basis of this gain. The output-side optical amplifier 200 may have a multi-stage structure.

The gain may be set on the basis of the input signal level in each of the input-side optical amplifier 100 and output-side optical amplifier 200, and the pumping light sources 121 and 221 may be controlled on the basis of the gains. In this case, by appropriately distributing the gains of the input-side optical amplifier 100 and output-side optical amplifier 200, more complete constant output control can be performed by the optical amplifier for wavelength-multiplexing transmission as a whole including the input-side optical amplifier 100 and output-side optical amplifier 200.

(Fourth Embodiment)

Figure 8:
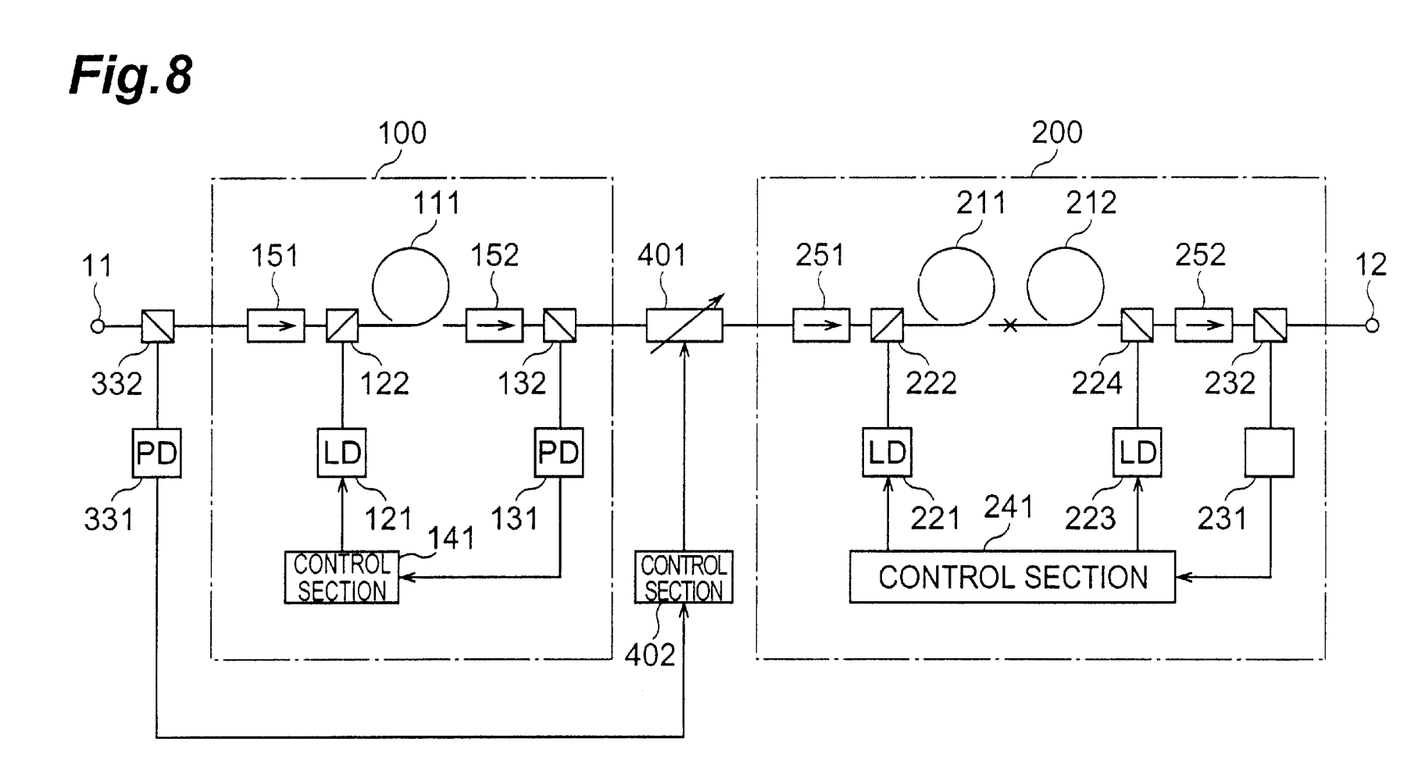
FIG. 8 is a view showing the arrangement of an optical amplifier for wavelength-multiplexing transmission according to the fourth embodiment.

An optical amplifier for wavelength-multiplexing transmission according to the fourth embodiment of the present invention will be described next. FIG. 8 is a view showing the arrangement of the optical amplifier for wavelength-multiplexing transmission according to the fourth embodiment. The optical amplifier for wavelength-multiplexing transmission according to the fourth embodiment is different from that of the first embodiment in that the optical amplifier further comprises an light attenuator 401 inserted between an input-side optical amplifier 100 and an output-side optical amplifier 200 and having a variable attenuation factor relative in response to signals, and a control section 402 for controlling the attenuation factor of the light attenuator 401 in accordance with input signal level.

Figure 9:
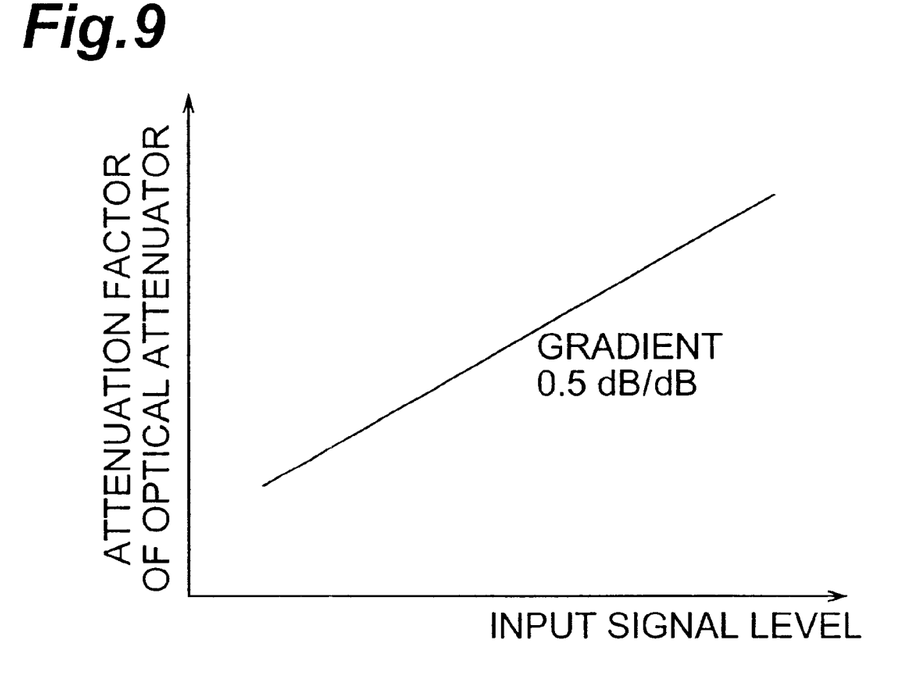
FIG. 9 is a graph showing the relationship between the input signal level and the attenuation factor of an optical attenuator in the optical amplifier for wavelength-multiplexing transmission according to the fourth embodiment.

FIG. 9 is a graph showing the relationship between the input signal level and the attenuation factor of the optical attenuator 401 in the optical amplifier for wavelength-multiplexing transmission according to the fourth embodiment. As shown in FIG. 9, as the input signal level detected by a light-receiving element 331 becomes high, the attenuation factor of the light attenuator 401, which is controlled by the control section 402, is set to be large. The gradient of the attenuation factor relative to the input signal level is, e.g., about +0.5 dB/dB.

In this embodiment, signals input to an input terminal 11 are amplified by the input-side optical amplifier 100 under constant output control and then attenuated by the light attenuator 401 by the attenuation factor corresponding to the input signal level. Hence, the higher the input signal level is, the lower the level of each signal output from the light attenuator 401 and input to the output-side optical amplifier 200 becomes. The signals are amplified by the output-side e optic al amplifier 200 under constant output control. Thus, the optical amplifier for wavelength-multiplexing transmission according to the fourth embodiment has almost the same effect as that of the first embodiment and can also maintain the wavelength dependence of total gain small even when the input signal level varies.

In addition, as described in the first embodiment, the dependence on the wavelength $\lambda$ of the value $DGT(\lambda)$ is small even without the light attenuator 401. For this reason, in the fourth embodiment using the light attenuator 401, the rate of change in attenuation factor of the light attenuator 401 with respect to a change in input signal level can be made small, and therefore, the dynamic range of input signal level can be further widened. Furthermore, the optical amplifier can be used even when the input signal level exceeds the variable range of the attenuation factor of the light attenuator 401.

(Fifth Embodiment)

Figure 10:
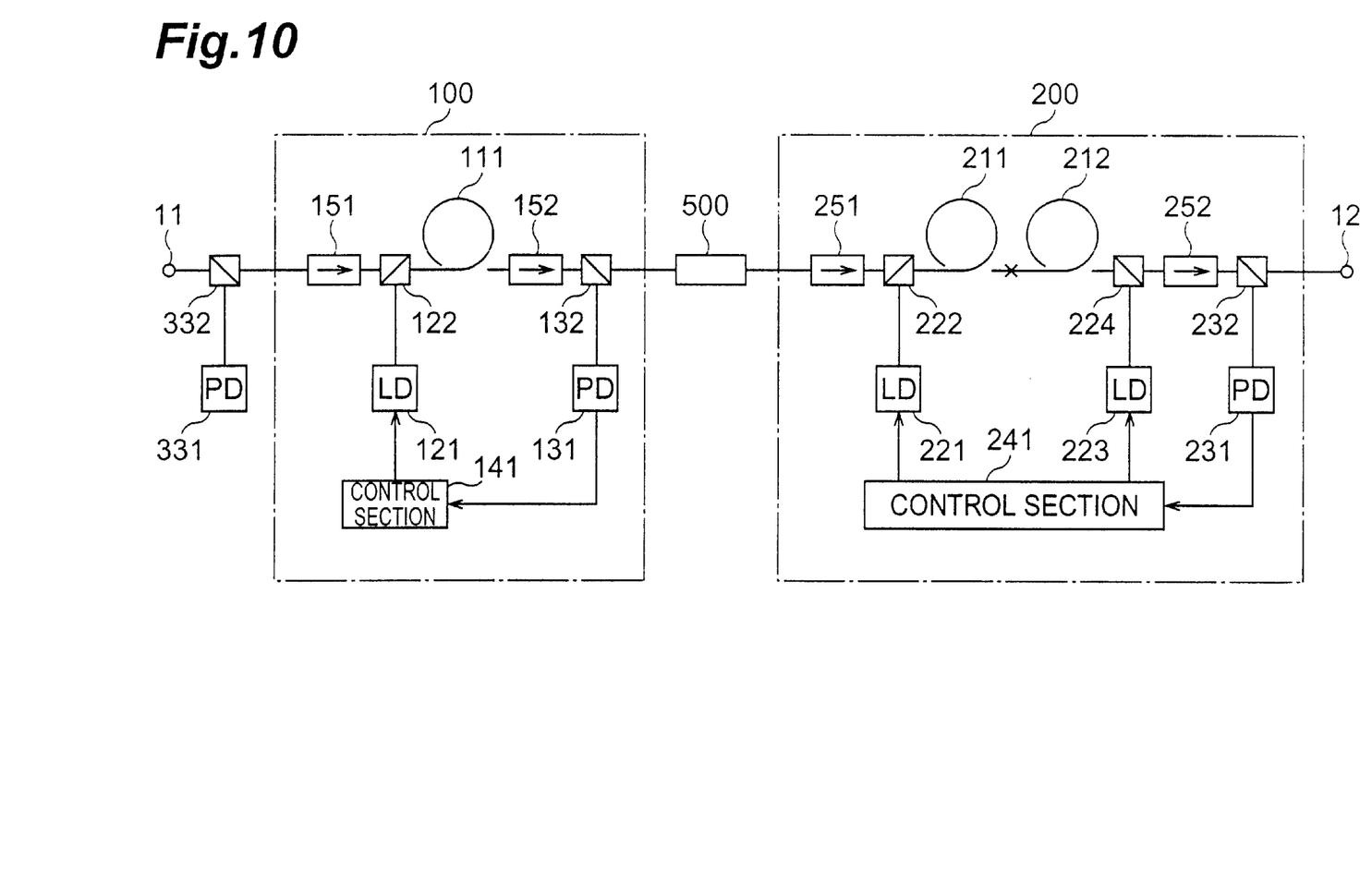
FIG. 10 is a view showing the arrangement of an optical amplifier for wavelength-multiplexing transmission according to the fifth embodiment.

An optical amplifier for wavelength-multiplexing transmission according to the fifth embodiment of the present invention will be described next. FIG. 10 is a view showing the arrangement of the optical amplifier for wavelength-multiplexing transmission according to the fifth embodiment. The optical amplifier for wavelength-multiplexing transmission according to the fifth embodiment is different from that of the first embodiment in that the optical amplifier further comprises a gain equalizer 500 inserted between an input-side optical amplifier 100 and an output-side optical amplifier 200 to equalize the gain for the signals.

In this embodiment, signals input to an input terminal 11 are amplified by the input-side optical amplifier 100 under constant output control, gain-equalized by the gain equalizer 500, and then optically amplified by the output-side optical amplifier 200 under constant output control. Thus, the optical amplifier for wavelength-multiplexing transmission according to the fifth embodiment has almost the same effect as that of the first embodiment and can also further reduce the wavelength dependence of total gain.

The present invention is not limited to the above embodiments, and various changes and modifications can be made. For example, two or more of characteristic features that the target output value or gain of the input-side optical amplifier 100 or output-side optical amplifier 200 may be set on the basis of input signal level, the light attenuator 401 with a variable attenuation factor is inserted between the input-side optical amplifier 100 and the output-side optical amplifier 200, and the gain equalizer 500 is inserted between the input-side optical amplifier 100 and the output-side optical amplifier 200 may be combined.

As has been described above in detail, according to the present invention, input signals are sequentially optically amplified and output by the input-side optical amplifier and output-side optical amplifier. In optical amplification for signals by the input-side optical amplifier, the first pumping means for supplying first pumping light to the first amplification optical fiber is controlled by the first pumping light control means such that the amplification gain to signals by the first amplification optical fiber decreases in proportion to the increase amount of input signal level. The first pumping light control means supplies pumping light having power equal to or smaller than the minimum pumping light power at which the gain of the first amplification optical fiber which has received the minimum input level for the largest number of wavelengths in use causes saturation for an increase in input signal level beyond the minimum level. In optical amplification for signals by the output-side optical amplifier, the second pumping means for supplying second pumping light to the second amplification optical fiber is controlled by the second pumping light control means such that the level of each signal output from the second amplification optical fiber has the second gain or target output value. With such control, even when the gain control range is wide in a region where the input signal level is high, the dynamic range of input signal level can be widened almost without limitations on gain of the input-side optical amplifier. In addition, constant output control can be performed as a whole.

When both the input-side optical amplifier and output-side optical amplifier perform constant output control, the wavelength dependence of total gain is small even when the input signal level varies, so the dynamic range of the input signal level can be widened.

When the first (or second) target output value of the first (or second) pumping light control means is set on the basis of input signal level detected by the input signal level detection means, and constant output control is performed such that the output signal level has the set first (or second) target output value, the wavelength dependence of total gain can be maintained small even when the input signal level varies.

When the gain of optical amplification by the first (or second) amplification optical fiber is set on the basis of input signal level detected by the input signal level detection means, and the first (or second) pumping means is controlled on the basis of this gain, constant output control is performed in the input-side (or output-side) optical amplifier such that the output signal level has the first (or second) target output value. Hence, even when the input signal level varies, the wavelength dependence of total gain can be maintained small.

When signals are amplified by the input-side optical amplifier under constant output control, attenuated by the optical attenuator by an attenuation factor corresponding to input signal level detected by the input signal level detection means, and then optically amplified by the output-side optical amplifier under constant output control, the wavelength dependence of total gain can be maintained small even when the input signal level varies.

When a gain equalizer inserted between the input-side optical amplifier and the output-side optical amplifier to equalize the wavelength dependence of gain for signals as a whole is used, the wavelength dependence of total gain can be further reduced.

When the first amplification optical fiber is formed from an Er-doped optical fiber co-doped with Al, and the second amplification optical fiber comprises an Er-doped optical fiber co-doped with Al and P and an Er-doped optical fiber co-doped with Al, which are connected in this order, the wavelength dependence of total gain can be maintained small even when the gain of the input-side optical amplifier is small, and the level of each signal input to the output-side optical amplifier is low.

When the first pumping light at least from the front side is supplied to the first amplification optical fiber by the first pumping means, the inverted distribution state near the signal incident side of the first amplification optical fiber can be made high even when the gain of the input-side optical amplifier is small, and the first amplification optical fiber has a low inverted distribution state as a whole. For this reason, degradation in noise factor can be reduced.

What is claimed is:

1. An optical amplifier for wavelength-multiplexing transmission, comprising:

an input-side optical amplifier having a first amplification optical fiber for amplifying input signals and outputting the signals, first pumping means for supplying, to said first amplification optical fiber, first pumping light having power not more than minimum pumping light power at which a gain of said first amplification optical fiber which has received a minimum input level for the largest number of channels in use causes gain saturation for an increase in input signal level beyond the minimum level, and first pumping light control means for controlling said first pumping means so that an amplification gain for each signal in said first amplification optical fiber decreases in proportion to a level increase amount of each input signal; and an output-side optical amplifier having a second amplification optical fiber for amplifying the signals input from said input-side optical amplifier and outputting the signals, second pumping means for supplying second pumping light to said second amplification optical fiber, and second pumping light control means for controlling said second pumping means so that level of each signal output from said second amplification optical fiber becomes a second gain or target output value.

2. An optical amplifier according to claim 1, wherein said first pumping light control means controls said first pumping means so that the level of each signal output from said first amplification optical fiber becomes a first gain or target output value.

3. An optical amplifier according to claim 2, wherein said optical amplifier further comprises input signal level detection means for detecting the level of each signal input to said input-side optical amplifier, and wherein said first pumping light control means sets the first gain or target output value in accordance with the level of each signal detected by said input signal level detection means.

4. An optical amplifier according to claim 1, wherein said optical amplifier further comprises input signal level detection means for detecting the level of each signal input to said input-side optical amplifier, and wherein said second pumping light control means sets the second gain or target output value in accordance with the level of each signal detected by said input signal level detection means.

5. An optical amplifier according to claim 1, wherein said optical amplifier further comprises input signal level detection means for detecting the level of each signal input to said input-side optical amplifier, and wherein said first pumping light control means sets the gain of optical amplification in said first amplification optical fiber in accordance with the level of each signal detected by said input signal level detection means, and controls said first pumping means on the basis of the gain.

6. An optical amplifier according to claim 5, wherein said input-side optical amplifier includes a first optical amplification section and second optical amplification section, and wherein said first pumping light control means sets the gain of optical amplification for each of said first and second optical amplification sections in accordance with the level of each signal detected by said input signal level detection means.

7. An optical amplifier according to claim 1, wherein said optical amplifier further comprises input signal level detection means for detecting the level of each signal input to said input-side optical amplifier, and wherein said second pumping light control means sets the gain of optical amplification in said second amplification optical fiber in accordance with the level of each signal detected by said input signal level detection means and controls said second pumping means on the basis of the gain.

8. An optical amplifier according to claim 7, wherein said output-side optical amplifier includes a first optical amplification section and second optical amplification section, and wherein said second pumping light control means sets the gain of optical amplification for each of said first and second optical amplification sections in accordance with the level of each signal detected by said input signal level detection means.

9. An optical amplifier according to claim 1, further comprising:

input signal level detection means for detecting the level of each signal input to said input-side optical amplifier;

an optical attenuator inserted between said input-side optical amplifier and said output-side optical amplifier and having a variable attenuation factor for the signals; and attenuation factor control means for controlling the attenuation factor of said optical attenuator in accordance with the level of each signal detected by said input signal level detection means.

10. An optical amplifier according to claim 1, further comprising a gain equalizer inserted between said input-side optical amplifier and said output-side optical amplifier to equalize a wavelength dependence of gain for the signals as a whole.

11. An optical amplifier according to claim 1, wherein said first amplification optical fiber comprises an Er-doped optical fiber co-doped with Al.

12. An optical amplifier according to claim 1, wherein said second amplification optical fiber comprises an Er-doped optical fiber co-doped with Al and P and an Er-doped optical fiber co-doped with Al, which are connected in the order named.

13. An optical amplifier according to claim 1, wherein said first pumping means supplies the first pumping light at least from a front side to said first amplification optical fiber.

* * * * *